United States Patent [19]

Kobayashi

[11] Patent Number: 5,128,805
[45] Date of Patent: Jul. 7, 1992

[54] ZOOM LENS SYSTEM

[75] Inventor: Yuko Kobayashi, Tokyo, Japan

[73] Assignee: Olympus Optical Co., Ltd., Tokyo, Japan

[21] Appl. No.: 585,265

[22] Filed: Sep. 18, 1990

Related U.S. Application Data

[63] Continuation of Ser. No. 410,497, Sep. 21, 1989, abandoned.

Foreign Application Priority Data

Sep. 22, 1988 [JP] Japan .................. 63-236340

[51] Int. Cl.⁵ .................................. G02B 15/14
[52] U.S. Cl. ........................... 359/687; 359/654
[58] Field of Search ........... 350/413, 423, 426, 427; 359/687, 654

[56] References Cited

U.S. PATENT DOCUMENTS

| 4,776,679 | 10/1988 | Kitagishi et al. | 350/427 |
| 4,830,476 | 5/1989 | Aoki | 350/427 |
| 4,842,386 | 6/1989 | Kitagishi et al. | 350/427 |
| 4,859,040 | 8/1989 | Kitagishi et al. | 350/426 X |

FOREIGN PATENT DOCUMENTS 61-172110 8/1986 Japan .

Primary Examiner—Scott J. Sugarman
Attorney, Agent, or Firm—Cushman, Darby & Cushman

[57] ABSTRACT

A zoom lens system comprising a plural number of lens units, so adapted as to perform variation of focal length by varying airspace reserved between each pair of the lens units and comprising, in a negative lens unit arranged in a vari-focal lens group, at least one radial GRIN lens component having a concave shape and refractive index lowered as the lens portions are farther from the optical axis toward the outer circumference in the direction perpendicular to the optical axis.

16 Claims, 6 Drawing Sheets

SPHERICAL ABERRATION

ASTIGMATISM

DISTORTION

SPHERICAL ABERRATION

ASTIGMATISM

DISTORTION

ZOOM LENS SYSTEM

This is a continuation of application Ser. No. 07/410,497, filed Sep. 21, 1989, which was abandoned upon fie filing hereof.

BACKGROUND OF THE INVENTION a) Field of the Invention

The present invention relates to a zoom lens system having a high vari-focal ratio covering a range of wide angles and to be used mainly with photographic cameras.

b) Description of the Prior Art

As zoom lens systems having high vari-focal ratios covering ranges of wide angles, there are known the zoom lens systems consisting of a plural number of lens units including a first lens unit which is arranged on the extremely object side and has positive refractive power, and a second lens unit which is arranged on the image side of said first lens unit and has negative refractive power. In the recent years where compactness and enhancement of zooming ratios are demanded for zoom lens systems which are used widely, it is necessary for obtaining compactness to strengthen refractive powers of the lens units or shorten distance between the principal points of the lens units in the zoom lens systems of the type described above. Further, in order to enhance vari-focal ratios, it is effective to prolong the moving distance of the second negative lens unit which is used as the variator (the lens unit having the highest vari-focal function) and strengthen power of said lens unit. However, prolonging the moving distance of the lens unit is conflicting with compactness of lens systems. In order to design a compact zoom lens system having a high vari-focal ratio, it is therefore necessary to strengthen power of the second negative lens unit. When a field angle is widened at the wide position of a zoom lens system having a vari-focal ratio higher than 3, however, the second lens unit must have a very strong power, thereby making it difficult to correct aberrations. Since the second lens unit has the high vari-focal function, aberrations are varied remarkably by varying focal length and such variations cannot be corrected unless the aberrations produced by the second lens unit are not reduced.

The conventional zoom lens systems wherein the second lens unit is composed only of homogenous lens elements tend to have large negative Petzval's sums due to the negative power of the second lens unit, and produce especially spherical aberration and curvature of field which are remarkable on the positive sides. For this reason, it is obliged to compose the second negative lens unit of a very large number of lens elements to minimize the variations of aberrations to be caused by varying focal length. When the second negative lens unit is composed of a large number of lens elements, the principal point of the second lens unit is located within this lens unit, thereby making it impossible to reserve a distance between the principal points of the lens units arranged on the object side and the image side respectively of the second lens unit.

In the recent years, attention is attracted to the graded refractive index lenses (GRIN lenses) having refractive index varying depending on internal portions thereof. The GRIN lenses are classified into the so-called axial GRIN lens having refractive index varying in the direction along the optical axis and the so-called radial GRIN lens having refractive index varying in the direction perpendicular to the optical axis. Though the GRIN lenses are applied to optical systems for photographic cameras, no effective use has been established yet for these lenses.

As an example of the zoom lens systems using the GRIN lenses, there is known the lens system disclosed by Japanese Unexamined Published Patent Application No. 172110/61. This zoom lens system consists, in the order from the object side, of a first lens unit having positive refractive power, a second lens unit having negative refractive power and lens units arranged on the image side of the second lens unit, and uses a GRIN lens in the second negative lens unit. The GRIN lens used in this zoom lens system has curvature of the surface thereof which is lowered by sharing the power of the GRIN lens with the medium thereof. In other words, a portion of the power of the second lens unit (the variator) is shared as the power of the medium of the GRIN lens.

When the power of the second lens unit is partially shared as the power of a GRIN lens, however, the interior (medium) of the GRIN lens produces aberrations which are similar to those produced by imparting power to homogenous lens elements. The above-mentioned conventional zoom lens system in which negative power is imparted to the interior (medium) of the GRIN lens produces the aberrations similar to those produced by the homogenous lens elements. Accordingly, this zoom lens system is not suited for use as a zoom lens system having a high vari-focal ratio at the wide position where the second lens unit must have strong negative power.

Further, in order to design a zoom lens system consisting of a plural number of lens units and adapted to vary airspaces reserved between the lens units so as to have a high vari-focal ratio covering a range of wide angles, it is necessary to use a lens unit which has a high vari-focal function and strong negative power. When an attempt is made to compose this lens unit having the strong negative power only of homogenous lens elements, it is necessary to use a large number of lens elements, thereby making it impossible to design a compact zoom lens system.

SUMMARY OF THE INVENTION

A primary object of the present invention is to provide a zoom lens system so designed as to have aberrations favorably corrected at a high vari-focal ratio covering a range of wide angles by effectively using a graded refractive index lens component in a lens unit having strong negative power.

The zoom lens system according to the present invention consists of a plural number of lens units, is so adapted as to perform variation of focal length by varying airspaces reserved between each pair of the lens units, comprises a negative lens unit as a lens unit contributing to the variation of focal length, and uses, in the negative lens unit, at least one radial graded refractive index lens component which has a concave shape and refractive index lowered as the lens portions are farther from the optical axis toward the margin in the direction perpendicular to the optical axis.

The "concave shape" means here a lens sectional shape having thickness larger at the marginal portion than at the central portion on the optical axis.

Further, the zoom lens system according to the present invention is characterized in that said lens unit having negative refractive power satisfies the following condition (1):

$$|f_n|/f_w < 0.9 \qquad (1)$$

wherein the reference symbol $f_n$ represents focal length of said lens unit having negative refractive power and the reference symbol $f_w$ designates focal length of the zoom lens system as a whole at the wide position thereof.

The zoom lens system according to the present invention consists, for example, of a first lens unit having positive refractive power and a second lens unit negative refractive power which are arranged in the order from the object side, and one lens unit or two lens units arranged on the image side of said second lens unit, comprises at least one graded refractive index lens component which has the concave shape and refractive index lowered as the lens portions are farther from the optical axis toward the margin in the direction perpendicular to the optical axis, and is so designed as to satisfy the above-mentioned condition (1).

The radial GRIN lens component can have power of the surface thereof and power of the medium thereof respectively. Aberrations are produced also by the surface thereof and the medium thereof respectively.

When the power of the negative lens unit is strengthened as described above, the aberrations produced by the negative refractive power and negative Petzval's aberration as well as positive spherical aberration and curvature of field are aggravated. In order to correct these aberrations, remarkable aberrations must be produced by positive refractive function. However, when an attempt is made to produce remarkable aberrations with a homogenous lens component having positive refractive function, the lens component inevitably has a strong positive power. It is undesirable for strengthening the negative power to arrange a lens component having strong positive power as described above in the negative lens unit.

Paying attention to the fact that aberrations are produced by both the surface and medium of the radial GRIN lens component, the present invention uses the radial GRIN lens component in the lens unit having the strong negative power. Used in this negative lens unit is at least one radial GRIN lens component which has the concave shape and refractive index lowered as the lens portions are farther from the optical axis toward the margin thereof in the direction perpendicular to the optical axis. The radial GRIN lens component produces aberrations by the positive functions of the interior and the surface thereof, and serves for favorably correcting the aberrations produced by the negative refractive function of the lens unit having negative refractive power. That is to say, the zoom lens system according to the present invention is so designed as to impart a refractive index distribution having positive refractive function to the GRIN lens component in such a manner that the aberrations produced by the negative lens unit are corrected with the aberrations produced by the positive refractive function. Though power of the negative lens unit is weakened by the positive power of the medium of the radial GRIN lens component, the aberrations produced by the negative lens elements can be corrected sufficiently with the aberrations produced by the medium thereof, and it is therefore possible to correct sufficiently favorably the aberrations produced by the second lens unit even when curvature is enhanced on the surface having the negative function of the radial GRIN lens component. In short, the aberrations can be corrected favorably even when negative power is imparted to the radial GRIN lens component having the concave shape.

Furthermore, in order to design the zoom lens system according to the present invention so as to have a high vari-focal ratio and sufficient compactness, it is desirable to design the lens unit having negative refractive power for contributing to variation of focal length, for example the second negative lens unit, so as to have a focal length $f_n$ satisfying the above-mentioned condition (1).

If the condition (1) is not satisfied, the vari-focal function will be too weak to obtain a vari-focal range covering wide angles, thereby making it impossible to obtain a zoom lens system having a high vari-focal ratio.

In addition, when distance in the direction perpendicular to the optical axis is represented by y, refractive index at a radius of y is designated by n(y), refractive index on the optical axis is denoted by $n_0$, and distribution coefficients are represented by $n_1, n_2, \ldots$, the refractive index distribution of the radial GRIN lens component used in the zoom lens system according to the present invention is expressed by the following formula:

$$n(y) = n_0 + n_1 y^2 + n_2 y^4 + n_3 y^6 + \ldots$$

It is desirable to design the radial GRIN lens component used in the second lens unit of the zoom lens system according to the present invention so as to satisfy the following condition (2):

$$-2 < (f_n)^2 n_1 < -0.002$$

wherein the reference symbol $n_1$ represents the distribution coefficient of the second order of the radial GRIN lens component.

If the upper limit of the condition (2) is exceeded, the radial GRIN lens component will have too weak a function as a positive lens component, or use of the radial GRIN lens component will be practically ineffective. Accordingly, the spherical aberration produced by the negative lens unit will have a large positive value and can hardly be corrected.

DETAILED DESCRIPTION OF THE PREFERRED EMBODIMENTS

Figure 1:
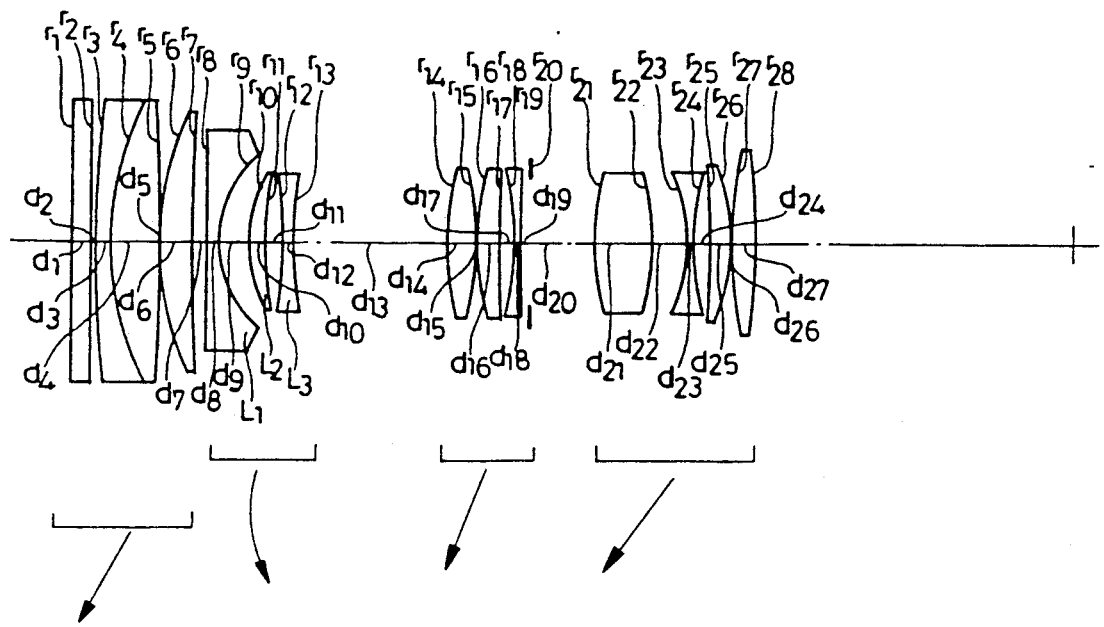
FIG. 1 through FIG. 3 show sectional views illustrating compositions of the Embodiments 1 through 3 respectively of the zoom lens system according to the present invention.

Now, the present invention will be described more detailedly below with reference to the Embodiments shown in the accompanying drawings and given in the form of the following numerical data:

Embodiment 1

$f = 36.2 \sim 130.28$, $F/3.55 \sim F/4.8$
$2\omega = 61.6° \sim 18.8°$

| | | | |
|---|---|---|---|
| $r_1 = \infty$ | $d_1 = 2.7000$ | $n_{01} = 1.51633$ | $\nu_{01} = 64.15$ |
| $r_2 = \infty$ | $d_2 = 0.7000$ | | |
| $r_3 = 181.2880$ | $d_3 = 2.3100$ | $n_{02} = 1.80518$ | $\nu_{02} = 25.43$ |
| $r_4 = 45.5050$ | $d_4 = 7.0500$ | $n_{03} = 1.54771$ | $\nu_{03} = 62.83$ |
| $r_5 = -369.3780$ | $d_5 = 0.1000$ | | |
| $r_6 = 47.6570$ | $d_6 = 4.5900$ | $n_{04} = 1.78590$ | $\nu_{04} = 44.18$ |
| $r_7 = 423.3260$ | $d_7 = D_1$ (variable) | | |
| $r_8 = -634.739$ | $d_8 = 1.84$ | $n_{05} = 1.80400$ | $\nu_{05} = 46.57$ |
| $r_9 = 16.525$ | $d_9 = 4.33$ | | |
| $r_{10} = 20.694$ | $d_{10} = 2.47$ | $n_{06} = 1.59270$ | $\nu_{06} = 35.29$ |
| $r_{11} = 51.601$ | $d_{11} = 2.55$ | | |
| $r_{12} = -66.500$ | $d_{12} = 1.6500$ | $n_{07}$ (graded refractive index lens) | |
| $r_{13} = 55.212$ | $d_{13} = D_2$ (variable) | | |
| $r_{14} = 41.0730$ | $d_{14} = 4.3400$ | $n_{08} = 1.58913$ | $\nu_{08} = 60.97$ |
| $r_{15} = -43.6550$ | $d_{15} = 0.1000$ | | |
| $r_{16} = 41.5560$ | $d_{16} = 3.3400$ | $n_{09} = 1.53172$ | $\nu_{09} = 48.90$ |
| $r_{17} = 465.1140$ | $d_{17} = 2.0900$ | | |
| $r_{18} = -39.0000$ | $d_{18} = 1.0000$ | $n_{010} = 1.80518$ | $\nu_{010} = 25.43$ |
| $r_{19} = 495.8750$ | $d_{19} = 1.4000$ | | |
| $r_{20} = \infty$ (stop) | $d_{20} = D_3$ (variable) | | |
| $r_{21} = 37.7310$ | $d_{21} = 8.4800$ | $n_{011} = 1.58913$ | $\nu_{011} = 60.97$ |
| $r_{22} = -37.7310$ | $d_{22} = 5.0700$ | | |
| $r_{23} = -25.3960$ | $d_{23} = 1.0000$ | $n_{012} = 1.80440$ | $\nu_{012} = 39.58$ |
| $r_{24} = 41.2000$ | $d_{24} = 2.1600$ | | |
| $r_{25} = -239.7400$ | $d_{25} = 3.2000$ | $n_{013} = 1.57501$ | $\nu_{013} = 41.49$ |
| $r_{26} = -29.4950$ | $d_{26} = 0.1000$ | | |
| $r_{27} = 66.8990$ | $d_{27} = 3.4700$ | $n_{014} = 1.51821$ | $\nu_{014} = 65.04$ |
| $r_{28} = -95.2570$ | | | |

| f | 36.20 | 85.09 | 130.28 |
|---|---|---|---|
| $D_1$ | 2.023 | 17.675 | 24.575 |
| $D_2$ | 22.811 | 9.360 | 2.839 |
| $D_3$ | 9.290 | 3.560 | 2.480 | graded refractive index lens
$n_{07}(d) = 1.6485 - 0.42366 \times 10^{-3} \cdot y^2$
$|f_n|/f_w = 0.49$, $(f_n)^2 \cdot n_1 = -0.134$

Embodiment 2

$f = 36.22 \sim 130.28$, $F/3.55 \sim F/4.8$
$2\omega = 61.6° \sim 18.8°$

| | | | |
|---|---|---|---|
| $r_1 = \infty$ | $d_1 = 2.7000$ | $n_{01} = 1.51633$ | $\nu_{01} = 64.15$ |
| $r_2 = \infty$ | $d_2 = 0.7000$ | | |
| $r_3 = 171.9251$ | $d_3 = 2.3100$ | $n_{02} = 1.80518$ | $\nu_{02} = 25.43$ |
| $r_4 = 43.9858$ | $d_4 = 7.0500$ | $n_{03} = 1.54771$ | $\nu_{03} = 62.83$ |
| $r_5 = -424.7248$ | $d_5 = 0.1000$ | | |
| $r_6 = 47.2151$ | $d_6 = 4.5900$ | $n_{04} = 1.78590$ | $\nu_{04} = 44.18$ |
| $r_7 = 434.2135$ | $d_7 = D_1$ (variable) | | |
| $r_8 = 219.8891$ | $d_8 = 1.28$ | $n_{05} = 1.69680$ | $\nu_{05} = 56.49$ |
| $r_9 = 18.0418$ | $d_9 = 4.40$ | | |
| $r_{10} = 465.7636$ | $d_{10} = 1.15$ | $n_{06} = 1.72916$ | $\nu_{06} = 54.68$ |
| $r_{11} = 20.4644$ | $d_{11} = 3.47$ | $n_{07} = 1.84666$ | $\nu_{07} = 23.78$ |
| $r_{12} = -1550.1803$ | $d_{12} = 1.92$ | | |
| $r_{13} = -25.4437$ | $d_{13} = 1.18$ | $n_{08}$ (graded refractive index lens) | |
| $r_{14} = -351.6723$ | $d_{14} = D_2$ (variable) | | |
| $r_{15} = 41.4993$ | $d_{15} = 4.3400$ | $n_{09} = 1.58913$ | $\nu_{09} = 60.97$ |
| $r_{16} = -44.0940$ | $d_{16} = 0.1000$ | | |
| $r_{17} = 41.9562$ | $d_{17} = 3.3400$ | $n_{010} = 1.53172$ | $\nu_{010} = 48.90$ |
| $r_{18} = -32443.9329$ | $d_{18} = 2.0900$ | | |
| $r_{19} = -35.9427$ | $d_{19} = 1.0000$ | $n_{011} = 1.80518$ | $\nu_{011} = 25.43$ |
| $r_{20} = 614.1617$ | $d_{20} = 1.4000$ | | |
| $r_{21} = \infty$ (stop) | $d_{21} = D_3$ (variable) | | |
| $r_{22} = 39.3991$ | $d_{22} = 8.4800$ | $n_{012} = 1.58913$ | $\nu_{012} = 60.97$ |
| $r_{23} = -35.7298$ | $d_{23} = 5.0700$ | | |
| $r_{24} = -26.2196$ | $d_{24} = 1.0000$ | $n_{013} = 1.80440$ | $\nu_{013} = 39.58$ |
| $r_{25} = 39.5564$ | $d_{25} = 2.1600$ | | |
| $r_{26} = -159.6063$ | $d_{26} = 3.2000$ | $n_{014} = 1.57501$ | $\nu_{014} = 41.49$ |
| $r_{27} = -29.9656$ | $d_{27} = 0.1000$ | | |
| $r_{28} = 57.4139$ | $d_{28} = 3.4700$ | $n_{015} = 1.51821$ | $\nu_{015} = 65.04$ |
| $r_{29} = -83.5526$ | | | |

| f | 36.22 | 85.09 | 130.28 |
|---|---|---|---|
| $D_1$ | 1.142 | 16.965 | 24.175 |
| $D_2$ | 22.951 | 9.498 | 2.875 |
| $D_3$ | 9.296 | 3.483 | 2.151 | graded refractive index lens
$n_{08}(d) = 1.67 - 0.39699 \times 10^{-3} \cdot y^2 - 0.29892 \times 10^{-7} \cdot y^4 - 0.14954 \times 10^{-9} \cdot y^6$
$n_{08}(c) = 1.66428 - 0.38771 \times 10^{-3} \cdot y^2 - 0.30074 \times 10^{-7} \cdot y^4 - 0.14873 \times 10^{-9} \cdot y^6$
$n_{08}(F) = 1.68334 - 0.41864 \times 10^{-3} \cdot y^2 - 0.29470 \times 10^{-7} \cdot y^4 - 0.15141 \times 10^{-9} \cdot y^6$
$|f_n|/f_w = 0.49$, $(f_n)^2 \cdot n_1 = -0.127$

Embodiment 3

$f = 36.22 \sim 130.28$, $F/3.55 \sim F/4.8$
$2\omega = 61.6° \sim 18.8°$

| | | | |
|---|---|---|---|
| $r_1 = \infty$ | $d_1 = 2.7000$ | $n_{01} = 1.51633$ | $\nu_{01} = 64.15$ |
| $r_2 = \infty$ | $d_2 = 0.7000$ | | |
| $r_3 = 181.2877$ | $d_3 = 2.3100$ | $n_{02} = 1.80518$ | $\nu_{02} = 25.43$ |
| $r_4 = 45.5049$ | $d_4 = 7.0500$ | $n_{03} = 1.54771$ | $\nu_{03} = 62.83$ |
| $r_5 = -369.3774$ | $d_5 = 0.1000$ | | |

-continued

| | | | |
|---|---|---|---|
| $r_6 = 47.6570$ | | | |
| | $d_6 = 4.5900$ | $n_{04} = 1.78590$ | $\nu_{04} = 44.18$ |
| $r_7 = 423.3253$ | | | |
| | $d_7 = D_1$ (variable) | | |
| $r_8 = 221.3673$ | | | |
| | $d_8 = 1.30$ | $n_{05} = 1.69680$ | $\nu_{05} = 56.49$ |
| $r_9 = 18.0769$ | | | |
| | $d_9 = 4.38$ | | |
| $r_{10} = -900.7936$ | | | |
| | $d_{10} = 1.12$ | $n_{06} = 1.72916$ | $\nu_{06} = 54.68$ |
| $r_{11} = 21.7725$ | | | |
| | $d_{11} = 3.42$ | $n_{07} = 1.84666$ | $\nu_{07} = 23.78$ |
| $r_{12} = -356.4974$ | | | |
| | $d_{12} = 1.90$ | | |
| $r_{13} = -24.7876$ | | | |
| | $d_{13} = 1.19$ | $n_{08}$ (graded refractive index lens) | |
| $r_{14} = -203.7063$ | | | |
| | $d_{14} = D_2$ (variable) | | |
| $r_{15} = 40.0729$ | | | |
| | $d_{15} = 4.3400$ | $n_{09} = 1.58913$ | $\nu_{09} = 60.97$ |
| $r_{16} = -43.6549$ | | | |
| | $d_{16} = 0.1000$ | | |
| $r_{17} = 41.0559$ | | | |
| | $d_{17} = 3.3400$ | $n_{010} = 1.53172$ | $\nu_{010} = 48.90$ |
| $r_{18} = 465.1132$ | | | |
| | $d_{18} = 2.0900$ | | |
| $r_{19} = -36.9759$ | | | |
| | $d_{19} = 1.0000$ | $n_{011} = 1.80518$ | $\nu_{011} = 25.43$ |
| $r_{20} = 495.8741$ | | | |
| | $d_{20} = 1.4000$ | | |
| $r_{21} = \infty$ (stop) | | | |
| | $d_{21} = D_3$ (variable) | | |
| $r_{22} = 37.7309$ | | | |
| | $d_{22} = 8.4800$ | $n_{012} = 1.58913$ | $\nu_{012} = 60.97$ |
| $r_{23} = -37.7309$ | | | |
| | $d_{23} = 5.0700$ | | |
| $r_{24} = -25.3960$ | | | |
| | $d_{24} = 1.0000$ | $n_{013} = 1.80440$ | $\nu_{013} = 39.58$ |
| $r_{25} = 41.1999$ | | | |
| | $d_{25} = 2.1600$ | | |
| $r_{26} = -239.7396$ | | | |
| | $d_{26} = 3.2000$ | $n_{014} = 1.57501$ | $\nu_{014} = 41.49$ |
| $r_{27} = -28.4950$ | | | |
| | $d_{27} = 0.1000$ | | |
| $r_{28} = 66.8989$ | | | |
| | $d_{28} = 3.4700$ | $n_{015} = 1.51821$ | $\nu_{015} = 65.04$ |
| $r_{29} = -95.2568$ | | | |

| f | 36.22 | 85.09 | 130.28 |
|---|---|---|---|
| $D_1$ | 1.196 | 16.984 | 24.124 |
| $D_2$ | 23.024 | 9.624 | 3.077 |
| $D_3$ | 9.290 | 3.560 | 2.480 | graded refractive index lens
$n_{08}(d) = 1.67000 - 0.39741 \times 10^{-3} \cdot y^2 - 0.19073 \times 10^{-7} \cdot y^4$
$n_{08}(c) = 1.66411 - 0.38829 \times 10^{-3} \cdot y^2 - 0.19141 \times 10^{-7} \cdot y^4$
$n_{08}(F) = 1.68375 - 0.41868 \times 10^{-3} \cdot y^2 - 0.18915 \times 10^{-7} \cdot y^4$
$|f_n|/f_w = 0.49, (f_n)^2 \cdot n_1 = -0.127$ wherein the reference symbol $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_{01}, n_{02}, \ldots$ denote refractive indices of the respective lens elements, and the reference symbol $\nu_{01}, \nu_{02}, \ldots$ represent Abbe's numbers of the respective lens elements. In the case when the i'th lens elements are graded refractive index lens, the reference symbols $n_{0i}$ ($n_{01}, n_{02}, \ldots$) designate refractive indices on the optical axis of the i'th lens elements, and refractive indices $n_i$ thereof are expressed by the following formula:

$$n_i = n_{0i} + n_{1i}y^2 + n_{2i}y^4 + \ldots$$

wherein the reference symbol y represents distance as measured from the optical axis in the radial direction and the reference symbols $n_{ji}$ are refractive index distribution coefficients of the 2j'th order for i'th lens elements.

The Embodiment 1 is a compact zoom lens system for single lens reflex cameras which is designed for a field angle of 62° at the wide position and a zooming ratio as high as 3.

The Embodiment 1 has the composition illustrated in FIG. 1 wherein the zoom lens system comprises, in the order from the object side, a first lens unit having positive refractive power, a second lens unit having negative refractive power, a third lens unit having positive refractive power and a fourth lens unit having positive refractive power, and is so adapted as to perform variation of focal length by varying the airspace reserved between each pair of the lens units.

Out of these lens units, the second lens unit having the strong negative power consists, in the order from the object side, a negative lens component $L_1$, a positive lens component $L_2$ and a negative lens component $L_3$, out of which the negative lens component $L_3$ is designed as the radial GRIN lens component which has the concave shape and refractive index lowered as the portions thereof are farther from the optical axis toward the margin in the direction perpendicular to the optical axis. Further, the negative lens component $L_1$ has strong negative power, whereas the positive lens component $L_2$ serves for correcting mainly spherical aberration out of the aberrations produced by the negative lens component $L_1$. Furthermore, the negative lens component $L_3$ which is designed as the radial GRIN lens component corrects, while sharing the negative power, curvature of field which is positive especially at the wide position by producing aberrations by the positive power thereof and suppresses variation of the spherical aberration caused by varying focal length.

In the Embodiment 1, the radial GRIN lens component used as the lens component $L_3$ shares approximately 36% of the negative power of the second lens unit and only 4% of the power is lost due to the radial GRIN lens component whose medium has a positive function. Though the negative lens component $L_3$ arranged on the extremely image side in the second lens unit is designed as the radial GRIN lens component, another negative lens component may be designed as the radial GRIN lens component. However, it is desirable for minimizing variation of coma to be caused by varying focal length to design the negative lens component $L_3$ arranged on the extremely image side as the radial GRIN lens component as in the Embodiment 1 described above.

Figure 4:
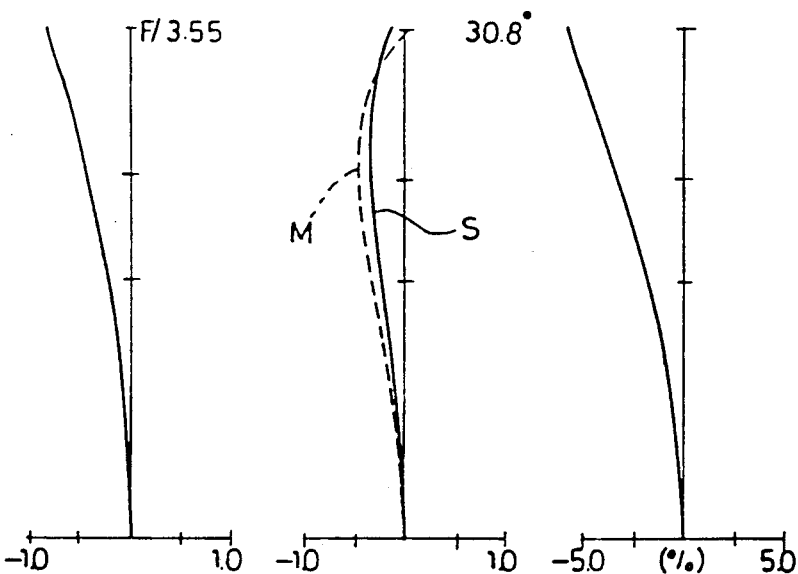
FIG. 4 through FIG. 6 show curves illustrating aberration characteristics of the Embodiment 1 of the present invention.
Figure 5:
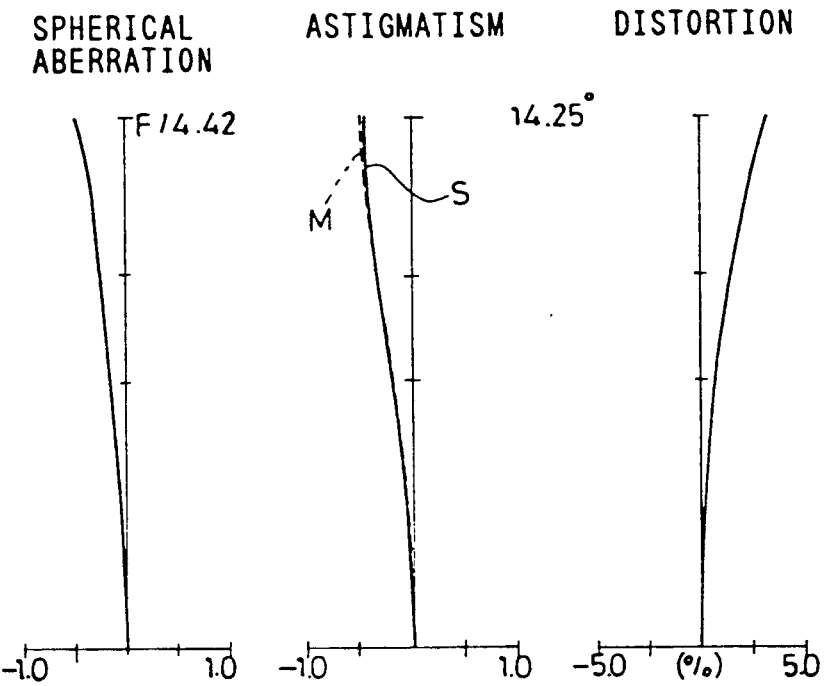
Figure 6:
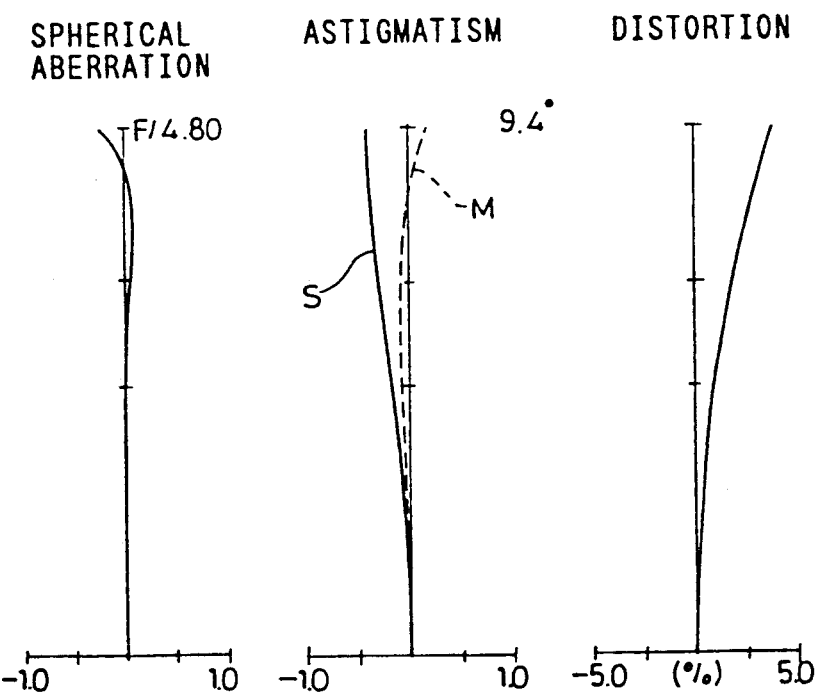

Aberration characteristics at the wide position, intermediate focal length and tele position of the Embodiment 1 are illustrated in FIG. 4, FIG. 5 and FIG. 6 respectively.

The Embodiment 2 is also a compact zoom lens system for single lens reflex cameras designed for a field angle of 62° at the wide position and a high zooming ratio of 3.

Figure 2:
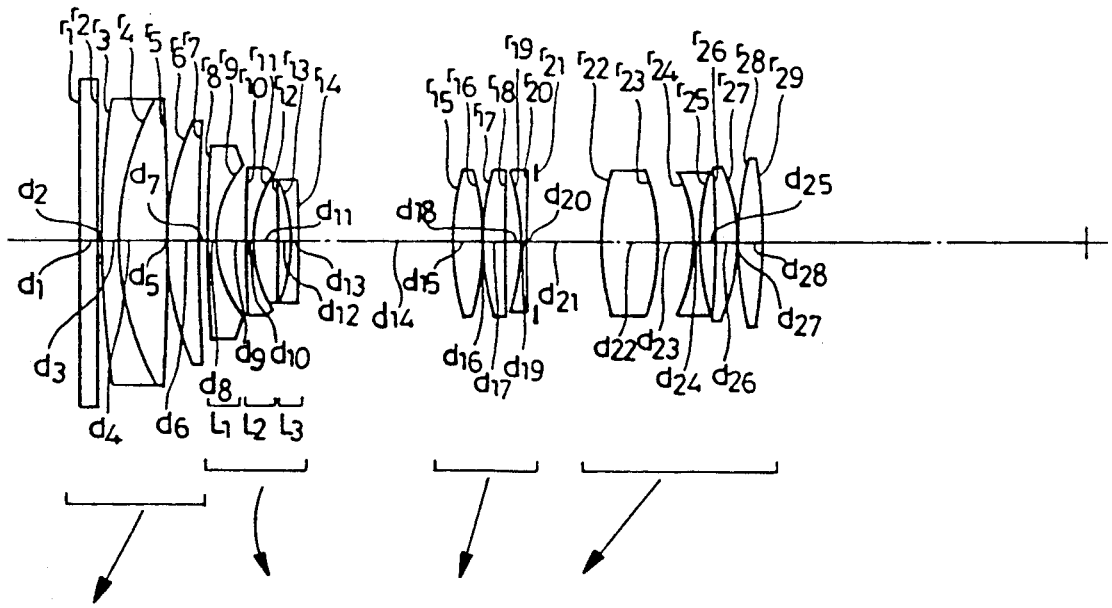

The Embodiment 2 has the composition illustrated in FIG. 2 wherein the zoom lens system comprises, in the order from the object side, a first lens unit having positive refractive power, a second lens unit having negative refractive power, a third lens unit having positive refractive power and a fourth lens unit having positive refractive power, and is so adapted as to perform zooming by varying the airspace reserved between each pair of the lens units. In this Embodiment, the second lens unit having the strong negative power is composed, in the order from the object side, of a negative lens component $L_1$, a cemented doublet $L_2$ having positive refractive power and a negative lens component $L_3$. The negative lens component $L_3$ arranged on the extremely image side is designed as the radial GRIN lens component having the concave shape and refractive index lowered as the lens portions are farther from the optical axis toward the margin in the direction perpendicular to the optical axis. Further, the lens component $L_1$ has strong negative power, whereas the lens component $L_2$ has a positive surface for correcting mainly curvature of field which is remarkable on the positive side out of the aberrations produced by the lens component $L_1$. Furthermore, the radial GRIN lens component (the lens component $L_3$) shares the negative power of the second lens unit and produces aberrations by the positive function thereof for correcting mainly the spherical aberration which is remarkable on the positive side, thereby minimizing the variation of the spherical aberration to be caused by varying focal length.

In the Embodiment 2, the radial GRIN lens component $L_3$ shares approximately 40% of the negative power of the second lens unit. Only 4% of the power is lost by imparting the positive function to the radial GRIN lens component and, on the other hand, aberrations are favorably corrected with the aberrations produced by the positive function.

Moreover, the Embodiment 2 uses a cemented doublet $L_2$ in the second lens unit for correcting chromatic aberration in this lens unit and minimizing the variation of chromatic aberration to be caused by varying focal length.

Figure 7:
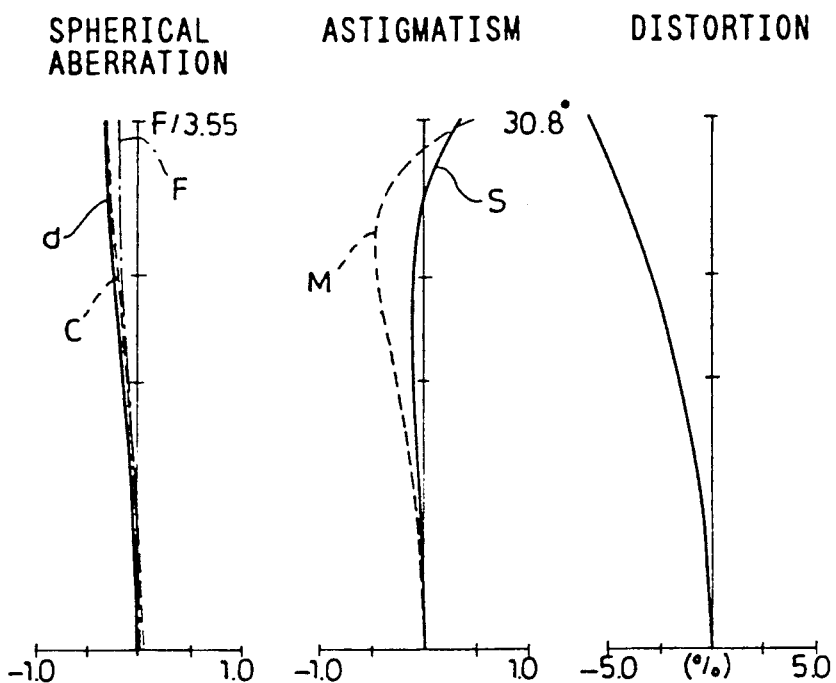
FIG. 7 through FIG. 9 show curves illustrating aberration characteristics of the Embodiment 2 of the present invention.
Figure 8:
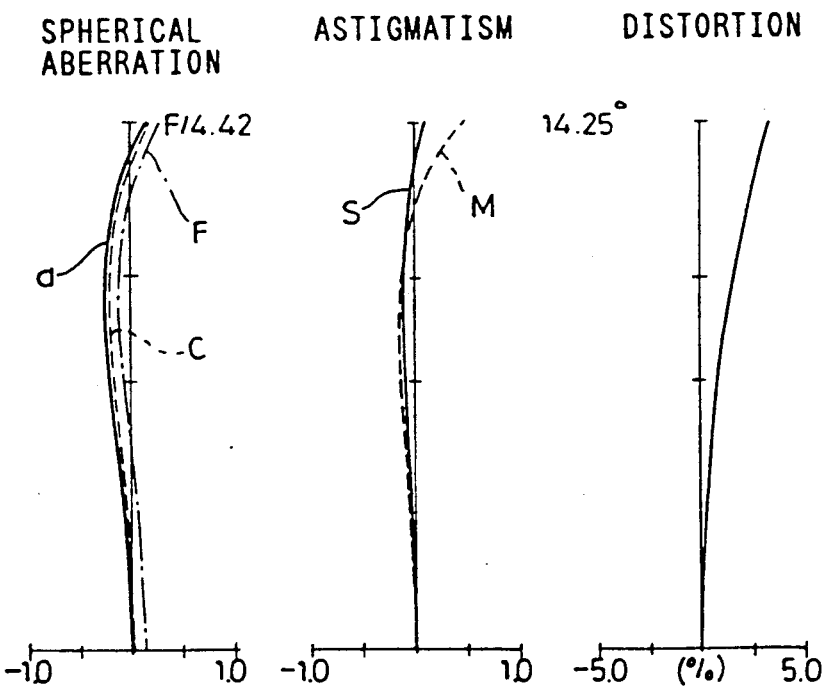
Figure 9:
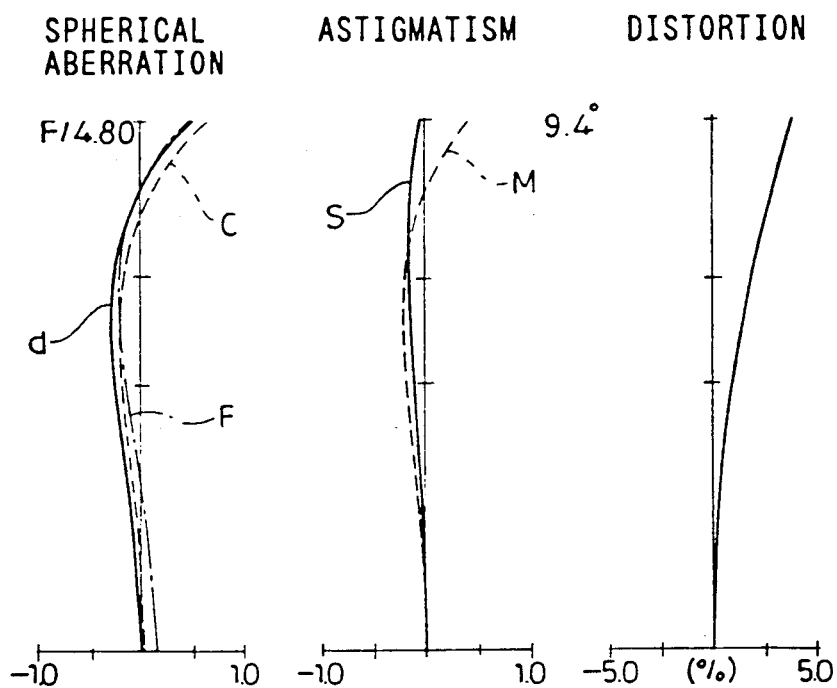

Aberration characteristics at the wide position, intermediate focal length and tele position of the Embodiment 2 are visualized in FIG. 7, FIG. 8 and FIG. 9 respectively.

Figure 3:
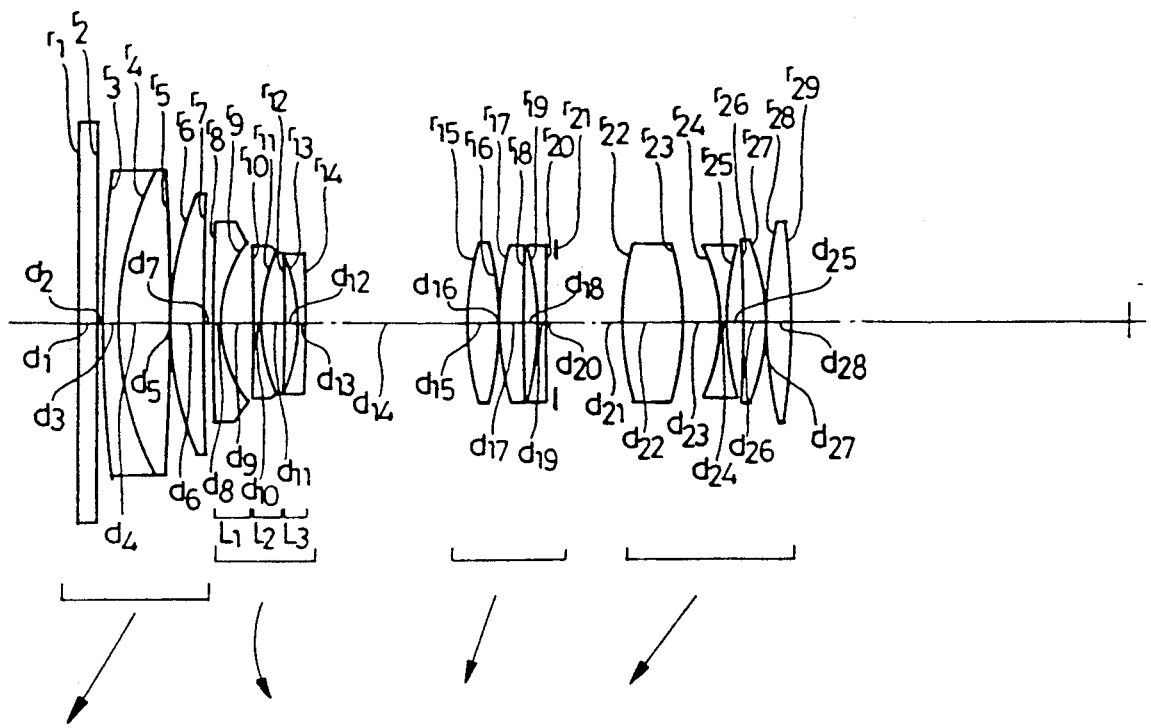

The Embodiment 3 is a compact zoom lens system designed for a zooming ratio of 3 and has the composition shown in FIG. 3 which is very similar to that of the Embodiment 3 which is very similar to that of the Embodiment 3 illustrated in FIG. 2. Further, the negative lens unit arranged on the extremely image side in the second lens unit is designed as the radial GRIN lens component which has the concave shape and refractive index lowered as the lens portions are farther from the optical axis toward the outer circumference in the direction perpendicular to the optical axis.

Figure 10:
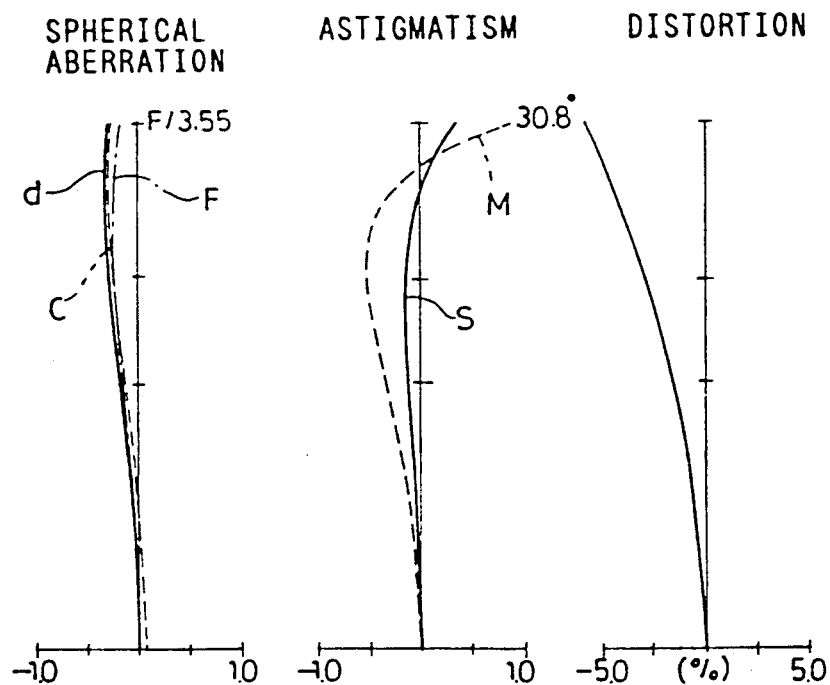
FIG. 10 through FIG. 12 show graphs illustrating aberration characteristics of the Embodiment 3 of the present invention.
Figure 11:
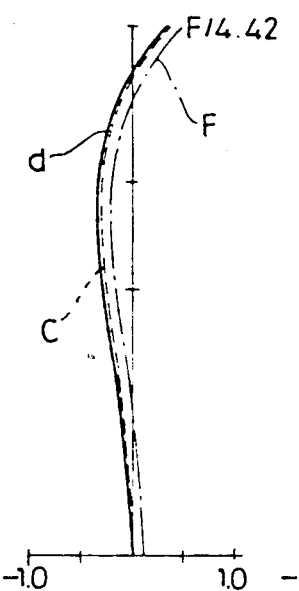
Figure 11:
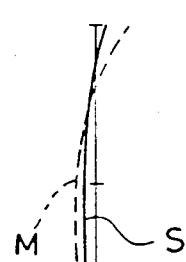
Figure 11:
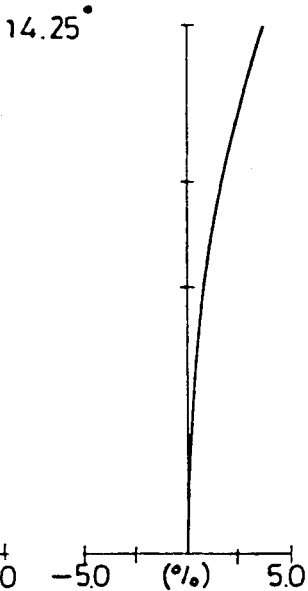
Figure 12:
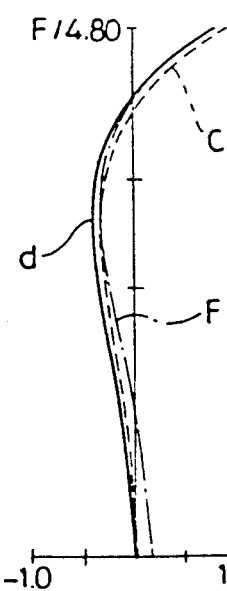
Figure 12:
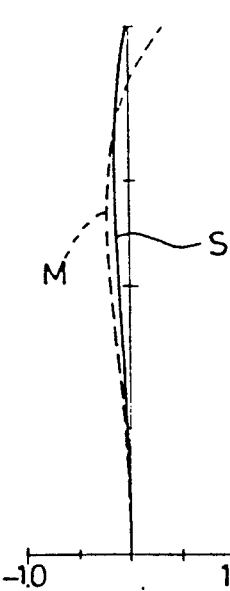
Figure 12:
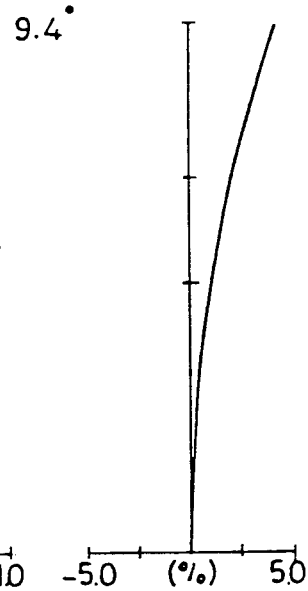

Aberration characteristics at the wide position, intermediate focal length and tele position of the Embodiment 3 are illustrated in FIG. 10, FIG. 11 and FIG. 12 respectively.

The zoom lens system according to the present invention if a compact lens system comprising a plural number of lens units, so adapted as to perform zooming by varying the airspaces reserved between each pair of the lens units and effectively using a radial GRIN lens component in a negative lens unit, whereby said zoom lens system has favorably corrected aberrations, allows little variations of aberrations to be caused by varying focal length, features a high vari-focal ratio and has a wide vari-focal range covering wide field angles.

I claim:

1. A zoom lens system comprising:
   in the order from the object side,
   a first positive lens unit disposed at a foremost location in said zoom lens system,
   a second negative lens unit disposed on the image side of said first lens unit, and
   two lens units with an airspace interposed therebetween disposed on the image side of said second lens unit,
   said airspace being variable for the performance of zooming,
   said second negative lens unit comprising a radial graded refractive index (GRIN) lens having a thickness that is larger at a marginal portion than that portion located on its optical axis and having refractive indices lowered as the lens portions are farther from the optical axis,
   said zoom lens system satisfying the following condition (1):

$$|f_n|/f_w < 0.9 \qquad (1)$$

wherein the reference symbol $f_n$ represents focal length of said negative lens unit and the reference symbol $f_w$ designates focal length of the zoom lens system as a whole at the wide position thereof.

2. A zoom lens system according to claim 1 wherein said radial GRIN lens component has a refractive index distribution expressed by the formula given below and is so structured as to satisfy the following condition (2):

$$n(y) = n_0 + n_1 y^2 + n_2 y^4 + n_3 y^6 + \ldots$$

$$-2 < (f_n)^2 n_1 < -0.002 \qquad (2)$$

wherein the reference symbol y represents distance as measured from the optical axis in the direction perpendicular to the optical axis, the reference symbol $n_0$ designates refractive index on the optical axis of the radial GRIN lens component, and the reference symbols $n_1$, $n_2$, . . . denotes coefficients that describe the form of distribution.

3. A zoom lens system according to claim 1 or 2 wherein said second negative lens unit comprises, in the order from the object side, a first negative lens component, an invariable airspace, a positive lens component, an invariable airspace and a second negative lens component, said second negative lens component being said radial graded refractive index lens.

4. A zoom lens system according to claim 1 or 2 wherein a third positive lens unit and a fourth positive lens unit are arranged on the image side of said second negative lens unit.

5. A zoom lens system according to claim 3 wherein said positive lens component is a cemented doublet.

6. A zoom lens system according to claim 1, wherein said radial GRIN lens element satisfies the following condition (2):

$$-2 < (f_n)^2 n_1 < -0.002 \qquad (2)$$

wherein the reference symbol $n_1$ represents the disbribution coefficient of second order of the radial GRIN lens component.

7. A zoom lens system comprising, in the order from an object side a first lens unit having a positive refractive power, a second lens unit having a negative refractive power, a third lens unit having a positive refractive power and a fourth lens unit having a positive refractive power, said second lens unit including a first negative lens component, a positive lens component and a second negative lens component arranged in the order from the object side, said second negative lens component being arranged on the image side and comprising at least one radial graded refractive index (GRIN) lens having a thickness larger at a marginal portion than on its optical axis and refractive indices which lower as the lens portions are farther from the optical axis, and said zoom lens system being structured as to satisfy the following condition (1)

$$|f_n|/f_w < 0.9 \tag{1}$$

wherein the reference symbol $f_n$ represents focal length of said negative lens unit and the reference symbol $f_w$ designates focal length of the zoom lens system as a whole at a wide position thereof.

8. A zoom lens system according to claim 7 wherein said radial GRIN lens has refractive indices expressed by the following formula and satisfies the condition (2) shown below:

$$n(y) = +n_0 + n_1 y^2 + n_2 y^4 + n_3 y^6 + \ldots$$

$$-2 < (f_n)^2 n_1 < -0.002 \tag{2}$$

wherein the reference symbol y represents distance as measured from the optical axis in the direction perpendicular to the optical axis, the reference symbol $n_0$ designates refractive index on the optical axis of the radial GRIN lens component, and the reference symbols $n_1$, $n_2$, ... denote coefficients that describe a form of distribution.

9. A zoom lens system comprising a plurality of lens units including a negative lens unit and adapted so as to perform zooming by varying the airspaces reserved between the lens units, said negative lens unit including a first negative lens component, a cemented doublet and a second negative lens component arranged in the order from the object side, said second negative lens component being arranged on the image side and comprising at least one radial graded refractive index (GRIN) lens having a thickness larger at a marginal portion than on its optical axis and refractive indices which lower as the lens portions are farther from the optical axis, and said zoom lens system being structured as to satisfy the following condition (1):

$$|f_n|/f_w < 0.9 \tag{1}$$

wherein the reference symbol $f_n$ represents focal length of said negative lens unit and the reference symbol $f_w$ designates focal length of the zoom lens system as a whole at a wide position thereof.

10. A zoom lens system according to claim 9 wherein said radial GRIN lens has refractive indices expressed by the following formula and satisfies the condition (2) shown below:

$$n(y) = +n_0 + n_1 y^2 + n_2 y^4 + n_3 y^6 + \ldots$$

$$-2 < (f_n)^2 n_1 < -0.002 \tag{2}$$

wherein the reference symbol y represents distance as measured from the optical axis in the direction perpendicular to the optical axis, the reference symbol $n_0$ designates refractive index on the optical axis of the radial GRIN lens component, and the reference symbols $n_1$, $n_2$, ... denote coefficients that describe the form of distribution.

11. A zoom lens system comprising, in order from the object side:

a first lens unit having a positive refractive power,
a second lens unit having a negative refractive power,
a third lens unit having a positive refractive power, and
a fourth lens unit having a positive refractive power, wherein said second lens unit comprises, in order from the object side, a negative lens component, a positive lens component, and a negative lens component, said negative lens component that is disposed on the image side comprising at least one radial graded refractive index (GRIN) lens element being thicker at a marginal portion thereof than at a portion being thicker at a marginal portion thereof than at a portion thereof located on the optical axis and having a refractive index that decreases directly proportional to distance from the optical axis, wherein said zoom lens system satisfies the following condition (1):

$$|f_n|/f_w < 0.9$$

wherein the reference symbol $f_n$ represents focal length of said negative lens unit and the reference symbol $f_w$ designates focal length of the zoom lens system as a whole at a wide position thereof.

12. A zoom lens system according to claim 1 wherein said radial GRIN lens has refractive indices expressed by the following formula and satisfies the condition (2) shown below:

$$n(y) = +n_0 + n_1 y^2 + n_2 y^4 + n_3 y^6 + \ldots$$

$$-2 < (f_n)^2 n_1 < -0.002 \tag{2}$$

wherein the reference symbol y represents distance as measured from an optical axis in a direction perpendicular to the optical axis, the reference symbol $n_0$ designates a refractive index on the optical axis of the radial GRIN lens component, and the reference symbols $n_1$, $n_2$, ... denote coefficients that describe a form of distribution.

13. A zoom lens system comprising a plurality of lens units including a negative lens unit and adapted so as to perform zooming by varying the airspaces reserved between the lens units, said negative lens unit including a first negative lens component, a positive lens component and a second negative lens component disposed in the order from the object side, said second negative lens component being disposed on the image side and comprising at least one radial graded refractive index (GRIN) lens having a thickness larger at a marginal portion that on its optical axis and refractive indices which lower as the lens portions are farther from the optical axis, and said zoom lens system being structured as to satisfy the following condition (1):

$$|f_n|/f_w < 0.9 \quad (1)$$

wherein the reference symbol $f_n$ represents focal length of said negative lens unit and the reference symbol $f_w$ designates focal length of the zoom lens system as a whole at a wide position thereof.

14. A zoom lens system according to claim 13 wherein said radial GRIN lens has refractive indices expressed by the following formula and satisfies the condition (2) shown below:

$$n(y) = +n_0 + n_1 y^2 + n_2 y^4 + n_3 y^6 + \ldots$$

$$-2 < (f_n)^2 n_1 < -0.002 \quad (2)$$

wherein the reference symbol y represents distance as measured from the optical axis in the direction perpendicular to the optical axis, the reference symbol $n_0$ designates refractive index on the optical axis of the radial GRIN lens component, and the reference symbols $n_1$, $n_2$, ... denote coefficients that describe the form of distribution.

15. A zoom lens system comprising a plurality of lens units including a negative lens unit and adapted so as to perform zooming by varying airspaces which are reserved between the lens units, said negative lens unit including a first negative lens component, a cemented doublet and a second negative lens component disposed in order from the object side, said second negative lens component being disposed on the image side and comprising at least one radial graded refractive index (GRIN) lens having a thickness larger at a marginal portion than on its optical axis and refractive indices which lower as the lens portions are farther from the optical axis, and said zoom lens system being structured as to satisfy the following conditions:

$$|f_n|/f_w < 0.9$$

wherein the reference symbol $f_n$ represents focal length of said negative lens unit and the reference symbol $f_w$ designates focal length of the zoom lens system as a whole at a wide position thereof.

16. A zoom lens system according to claim 15 wherein said radial GRIN lens has refractive indices expressed by the following formula and satisfies the condition (2) shown below:

$$n(y) = +n_0 + n_1 y^2 + n_2 y^4 + n_3 y^6 + \ldots$$

$$-2 < (f_n)^2 n_1 < -0.002 \quad (2)$$

wherein the reference symbol y represents distance as measured from an optical axis in a direction perpendicular to the optical axis, the reference symbol $n_0$ designates a refractive index on the optical axis of the radial GRIN lens component, and the reference symbols $n_1$, $n_2$, ... denote coefficients that describe a form of distribution.

* * * * *